(12) United States Patent
Shuck et al.

(10) Patent No.: US 12,005,505 B2
(45) Date of Patent: Jun. 11, 2024

(54) SURFACE TREATMENT OF ADDITIVELY MANUFACTURED COMPONENTS

(71) Applicants: Rolls-Royce Corporation, Indianapolis, IN (US); Rolls-Royce High Temperature Composites, Inc., Cypress, CA (US)

(72) Inventors: Quinlan Yee Shuck, Indianapolis, IN (US); Sungbo Shim, Irvine, CA (US)

(73) Assignees: Rolls-Royce Corporation, Indianapolis, IN (US); Rolls-Royce High Temperature Composites, Inc., Cypress, CA (US)

( * ) Notice: Subject to any disclaimer, the term of this patent is extended or adjusted under 35 U.S.C. 154(b) by 0 days.

(21) Appl. No.: 16/901,855

(22) Filed: Jun. 15, 2020

(65) Prior Publication Data

US 2020/0391292 A1    Dec. 17, 2020

Related U.S. Application Data

(60) Provisional application No. 62/862,281, filed on Jun. 17, 2019.

(51) Int. Cl.
| | |
|---|---|
| B22F 3/15 | (2006.01) |
| B22F 1/05 | (2022.01) |
| B22F 10/18 | (2021.01) |
| B22F 10/60 | (2021.01) |
| B22F 10/64 | (2021.01) |
| B28B 1/00 | (2006.01) |
| B33Y 10/00 | (2015.01) |

(52) U.S. Cl.
CPC ............... *B22F 3/15* (2013.01); *B22F 1/05* (2022.01); *B22F 10/18* (2021.01); *B22F 10/60* (2021.01); *B22F 10/64* (2021.01); *B28B 1/001* (2013.01); *B33Y 10/00* (2014.12)

(58) Field of Classification Search
CPC ........ B22F 3/15; B22F 1/0011; B22F 1/0059; B22F 10/60; B22F 12/00; B22F 10/10; B22F 3/22; B22F 5/10; B22F 10/18; B22F 2998/10; B22F 3/10; B28B 1/001; B28B 3/025; B28B 13/0205; B33Y 10/00; B33Y 40/20; Y02P 10/25
See application file for complete search history.

(56) References Cited

U.S. PATENT DOCUMENTS

| | | | | |
|---|---|---|---|---|
| 5,900,207 | A * | 5/1999 | Danforth | C04B 35/632 419/36 |
| 2018/0009134 | A1* | 1/2018 | Berben | B33Y 70/00 |
| 2018/0071986 | A1* | 3/2018 | Buller | G05B 19/4099 |
| 2019/0086126 | A1* | 3/2019 | Bunch | F25D 19/00 |

FOREIGN PATENT DOCUMENTS

WO    WO-2022154805 A1 *    7/2022

* cited by examiner

*Primary Examiner* — Rebecca Janssen
(74) *Attorney, Agent, or Firm* — Shumaker & Sieffert, P.A.

(57) ABSTRACT

A method may include depositing, from a slurry, suspension, or tape, on a surface of an additively manufactured component comprising a metal or alloy, powder comprising at least one of a metal, an alloy, or a ceramic; sintering the powder to form a surface layer on the additively manufactured component; and hot isostatic pressing the additively manufactured component and the surface layer.

21 Claims, 3 Drawing Sheets

SURFACE TREATMENT OF ADDITIVELY MANUFACTURED COMPONENTS

This application claims the benefit of U.S. Provisional Patent Application No. 62/862,281, filed Jun. 17, 2019, the entire content of which is incorporated herein by reference.

TECHNICAL FIELD

The disclosure relates to additive manufacturing techniques, in particular, to surface treatments for additively manufactured components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling, in which heated material, such as polymer, is extruded from a nozzle and cools to be added to the structure, or stereolithography, in which an energy source is used to selectively cure a liquid photopolymer resin to a desired shape of the component.

SUMMARY

The disclosure describes example techniques, systems, materials, and compositions for additively manufacturing components. In some examples, the disclosure describes a method that includes depositing, from a slurry, suspension, or tape, on a surface of an additively manufactured component comprising a metal or alloy, powder comprising at least one of a metal, an alloy, or a ceramic; sintering the powder to form a surface layer on the additively manufactured component; and hot isostatic pressing the additively manufactured component and the surface layer The details of one or more examples are set forth in the accompanying drawings and the description below. Other features, objects, and advantages will be apparent from the description and drawings, and from the claims.

DETAILED DESCRIPTION

The disclosure generally describes techniques for forming additively manufactured components and a surface layer on a surface of the additively manufactured component. The surface layer may include a powder deposited from a slurry, suspension, or tape. The surface layer may improve a surface finish of the additively manufactured component by at least partially filling steps in the surface, may fill channels or porosity at or near the surface of the additively manufactured component, or both. By filling channels or porosity at or near the surface of the additively manufactured component, the surface layer may enable further processing such as hot isostatic pressing, which may reduce porosity of the additively manufactured component, improve mechanical properties of the additively manufactured component, or both. By depositing the surface layer as a powder from a slurry, suspension, or tape, the surface layer may be deposited more economically and faster than if deposited using other techniques such as vapor deposition.

In some examples, the powder of the surface layer may be different from the material of the additively manufactured component. For example, the powder and the additively manufactured component may have substantially the same composition, but the powder may have a finer average particle size. This may facilitate the powder filling channels or pores at or near the surface of the additively manufactured component, and also may enable formation of first and second regions from the additively manufactured component and the powder, respectively, that include different grain sizes after formation of the additively manufactured component. Different grain sizes may result in different mechanical properties for the surface layer and the additively manufactured component, such as different creep resistance, toughness, fatigue performance, or the like.

As another example, the powder and the additively manufactured component may have different compositions. This may result in the surface layer and the additively manufactured component exhibiting different chemical properties, such as corrosion or oxidation resistance; different thermal properties, such as coefficient of thermal expansion; different mechanical properties, such as wear resistance; or the like. Using a powder with a different coefficient of thermal expansion than the additively manufactured component may enable formation of regions with residual compressive stress due to differential dimensional changes during cooling after sintering, or the like. Using a powder with a different chemical composition, such as including a ceramic, may improve wear resistance, environmental resistance, thermal conductivity, or the like of the surface layer compared to the additively manufactured component.

Figure 1:
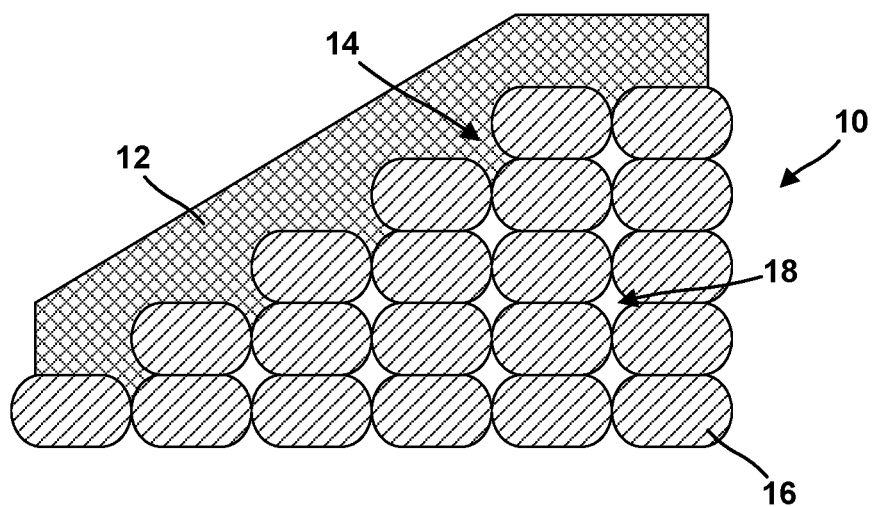
FIG. 1 is a conceptual diagram illustrating an example additively manufactured component and a surface layer including a powder on a surface of the additively manufactured component.

FIG. 1 is a conceptual diagram illustrating an example additively manufactured component 10 and a surface layer 12 on a surface 14 of additively manufactured component 10. Additively manufactured component 10 may be formed using any suitably additive manufacturing technique, such as fused deposition modelling or fused filament fabrication, stereolithography, or the like. For example, additively manufactured component 10 may be formed from a material, such as a filament, that includes a binder and a metal or alloy.

The metal or alloy may include any suitable metal or alloy for forming an additively manufactured component. In some examples, the metal or alloy includes a high-performance metal or alloy for forming component used in mechanical systems, such as a steel (e.g., stainless steel), a nickel-based alloy, a cobalt-based alloy, a titanium-based alloy, or the like. In some examples, the metal or alloy may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some examples, in addition to a metal or alloy, the material may include a ceramic, such as an oxide. For example, the material may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Materials including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

The material may also include a sacrificial binder. The sacrificial binders may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal, alloy, and/or oxide may be dispersed in the corresponding sacrificial binders, for example substantially uniformly dispersed in the corresponding sacrificial binders.

In some examples, the sacrificial binder(s) may be in the form of a curable polymer precursor. The curable polymer precursor may be curable (for example, thermally curable or photocurable) to form the sacrificial binder. The curable polymer precursor may include a precursor, for example, one or more monomers, oligomers, or non-crosslinked polymers suitable for forming the polymeric material of the sacrificial binder upon curing.

In some examples, the material may include, instead of, or in addition to, the curable polymer precursor, a flowable carrier. The flowable carrier may impart flowability to the composition, such that the composition may be extruded or drawn from a filament delivery device to form filaments that deposit in roads 16. The flowable carrier may be removed from roads 16, for example, by drying, evaporation, or the like, to cause the filaments to solidify. The flowable carrier may include an organic or inorganic solvent or mixture of solvents. In some examples, instead of, or in addition to, one or more solvents, the flowable carrier may include one or more of a gel, a resin, a monomer, an oligomer, a polymer, or a lubricant. In some examples, one or more of the resin, monomer, oligomer, or polymer may be substantially the same as the curable polymer precursor. In other examples, one or more of the resin, monomer, oligomer, or polymer may be different from the curable polymer precursor.

In some examples, the material includes a selected amount of sacrificial binder and metal, alloy, and/or ceramic so that the material in roads 16 includes more than about 80% by volume of the metal, alloy, and/or ceramic, which may result in a rigid component being formed in response to selective removal of the sacrificial binder. In some examples, the material in roads 16 includes sacrificial binder in an amount configured to cause the material to shrink by less than about 20 volume percent relative to an initial volume of the material in response to selectively removing the sacrificial binder. For example, the material in roads 16 may include less than about 20% by volume of the sacrificial binder.

In some examples, the material in roads 16 includes at least one shrink-resistant agent. For example, the at least one shrink-resistant agent may include a ceramic, instead of, or in addition to, the oxide in any ODS present in the material.

As shown in FIG. 1, as the material is deposited in roads 16, channels 18 may be left between adjacent roads 16. This occurs due to roads 16 being deposited from, for example, filaments. Although the filaments at least partially soften during the additive manufacturing technique, the filaments do not soften sufficiently to remove all space between adjacent roads 16. The space or channels 18 may be detrimental to mechanical properties of additively manufactured component 10. Further, channels 18 may be difficult to remove using techniques such as hot isostatic pressing (HIP), as the absence of a nonporous outer surface may allow liquid to infiltrate channels 18 such that compression cannot occur.

Additionally, roads 16 may define a surface of additively manufactured component 10 that is stepped, e.g., when the surface defines a non-parallel or non-perpendicular angle to the build direction. The stepped surface may be visible or tactile and may require additional processing to improve surface finish and surface properties of additively manufactured component 10. This additional processing may include machining, polishing, or the like, and may add time and expense to the manufacture of a final component from additively manufactured component 10.

In accordance with examples of the disclosure, a surface layer 12 including a powder may be formed on surface 14 of additively manufactured component 10. The powder may be deposited from a slurry, a suspension, a tape, or the like. The powder may include any of the metals, alloys, or ceramics mentioned above with respect to the material from which additively manufactured component 10 is formed. For example, the powder may include a steel (e.g., stainless steel), a nickel-based alloy, a cobalt-based alloy, a titanium-based alloy, or the like. In some examples, the metal or alloy may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. As another example, the powder may include an oxide-dispersion strengthened (ODS) alloy.

As a further example, the powder may include materials used to form a functional surface layer on additively manufactured component 10. The functional surface layer may include, for example, a wear resistant layer, a thermal barrier coating (TBC), an environmental barrier coating (EBC), or the like.

A wear resistant layer may include a ceramic or oxide such as, for example, silica, silicon nitride, silicon carbide, zirconium oxide, or the like. The wear resistant layer may have a hardness greater than a hardness of additively manufactured component 10.

An EBC may include at least one of a rare-earth oxide, a rare-earth silicate, an aluminosilicate, or an alkaline earth aluminosilicate. For example, an EBC may include mullite, barium strontium aluminosilicate (BSAS), barium aluminosilicate (BAS), strontium aluminosilicate (SAS), at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

A TBC may include zirconia or hafnia stabilized with one or more metal oxides, such as one or more rare earth oxides, alumina, silica, titania, alkali metal oxides, alkali earth metal oxides, or the like. For example, a TBC may include yttria-stabilized zirconia ($ZrO_2$) or yttria-stabilized hafnia, or zirconia or hafnia mixed with an oxide of one or more of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

The powder in surface layer 12 may be the same as or different from the metal, alloy, and/or ceramic in roads 16. In some examples, the powder in surface layer 12 may be the same as the metal, alloy, and/or ceramic in roads 16. In other examples, the powder in surface layer 12 may have the substantially same composition as the metal, alloy, and/or ceramic in roads 16, but may have a different average particle size and/or a different crystalline grain size within the particles. This may enable formation of a surface layer 12 that includes different grain sizes that the additively manufactured component 10. Different grain sizes may result in different mechanical properties for the surface layer and internal regions (e.g., additively manufactured component 10), such as different creep resistance, toughness, fatigue performance, or the like. The average particle size of the powder in surface layer 12 may be selected such that the powder at least partially fills and smooths the steps or other channels at and/or near surface 14. This may result in a smoother surface of the final manufactured component than surface 14 of additively manufactured component 10 and may facilitate further processing of additively manufactured component 10, such as HIP.

As another example, the powder in surface layer 12 may have a different composition than the metal, alloy, and/or ceramic in additively manufactured component 10. This may result in surface layer 12 exhibiting different chemical properties, such as corrosion or oxidation resistance; different thermal properties, such as coefficient of thermal expansion; different mechanical properties, such as wear resistance; or the like that additively manufactured component 10. For example, additively manufactured component 10 may include a first metal or alloy that includes relatively poorer oxidation or corrosion resistance than a second metal or alloy in the powder in surface layer 12. The second metal or alloy thus may be located at regions of the final component that will be exposed to oxygen or corrosive species and may provide superior oxidation or corrosion resistance compared to a component manufactured using only the first metal or alloy.

As another example, additively manufactured component 10 may include a first metal or alloy and the powder may include a blend of the first metal or alloy powder and a second, different metal alloy or powder to facilitate a common sintering process.

As another example, additively manufactured component 10 and the powder in surface region 12 may have different coefficients of thermal expansion. This may enable forming of regions with residual compressive stress due to differential dimensional changes during cooling after sintering. For example, additively manufactured component 10 may include a first metal or alloy that exhibits a higher coefficient of thermal expansion than a second metal or alloy in the powder of surface layer 12. Additively manufactured component 10 and surface layer 12 may be sintered to densify the component, and during cooling, the first metal or alloy will contract more than the second metal or alloy, inducing compressive stress in surface layer 12. The compressive stress may improve fatigue performance of the final component.

As another example, additively manufactured component 10 may include a metal or alloy, and the powder in surface region 12 may include a ceramic or oxide that forms a wear resistant coating, an EBC, a TBC, or combinations thereof.

Regardless of the composition of surface layer 12, surface layer 12 may be deposited from a slurry, a suspension, a tape, or the like. A slurry or suspension may include the powder and a liquid carrier. The liquid carrier may vary widely so long as it is compatible with the powder. In some examples, the liquid carrier includes an aqueous carrier (e.g., water). In other examples, the liquid carrier includes an alcohol, a glycol, or the like. In some examples, the slurry or suspension may optionally include one or more additives such as, for example, a dispersant, a binder, a surfactant, a pH adjustor, and the like.

The slurry or suspension may be applied to surface 14 of additively manufactured component 10 using any suitable technique, including, for example, dip coating, brushing, rolling, spraying, or the like. In other examples, a slurry may be deposited on a removable backing and dried to form a tape. The tape then may be applied to surface 14 of additively manufactured component 10.

Figure 2:
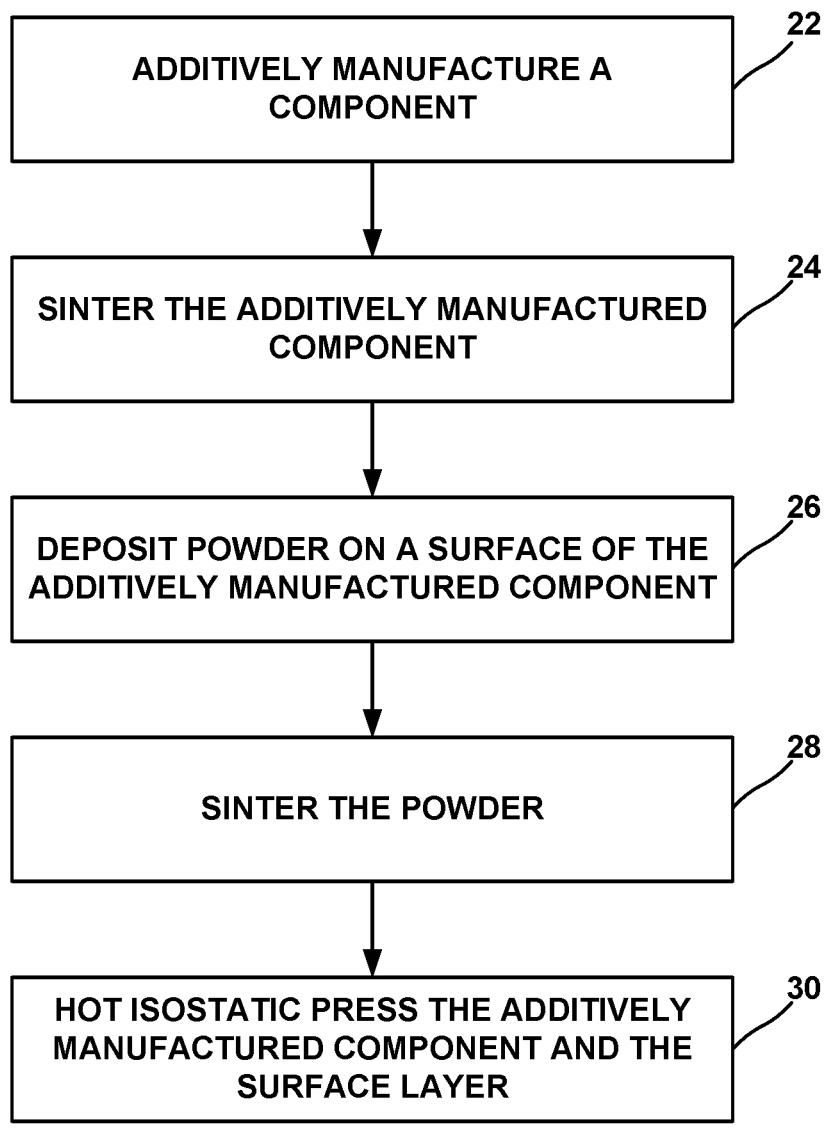
FIG. 2 is a flow diagram illustrating an example technique for forming an additively manufactured component and a surface layer including a powder on a surface of the additively manufactured component.

FIG. 2 is a flow diagram illustrating an example technique for forming an additively manufactured component and a surface layer including a powder on a surface of the additively manufactured component. Although the technique of FIG. 2 is described with respect to FIG. 1, in other examples, the technique of FIG. 2 may be used to form other articles.

The technique of FIG. 2 optionally includes additively manufacturing an additively manufactured component 10 (22). Additive manufactured component 10 may be additively manufactured using any suitable additive manufacturing technique, including, for example, powder bed, blown powder, stereolithography, fused deposition modelling or fused filament fabrication, or the like. For example, a fused deposition modelling additive manufacturing system may include a computing device, a filament delivery device, an optional enclosure, and a stage. The stage may be any suitable substrate defining a build surface. In some examples, the stage may be movable under control of the computing device to position the stage relatively to the filament delivery device. For example, the computing device may control movement of the stage in one or more axes (e.g., three orthogonal axes along which the stage can translate, five axes along which the stage can translate and rotate, six axes along which the stage can translate and rotate, or the like).

The filament delivery device may include a filament reel that holds wound filament including a respective material, a reservoir that holds a volume of a material, or the like. In examples in which the filament delivery devices include a filament reel, the computing device may control the filament delivery device to advance the filament from the reel and heat the filament to above a softening or melting point of the composition. The softened or melted filament is then extruded from a nozzle or a die and laid down in roads 16 on a major surface of the stage (or, in subsequent layers, on a previously deposited road). The softened or melted filaments cool and/or cure, and, in this way, are joined to other roads 16 to form additively manufactured component 10.

Similarly, in examples in which the filament delivery device includes a reservoir that holds a volume of material, the computing device may control the filament delivery device to cause the material to flow, extrude, or draw from the reservoir and out of a nozzle or die of the filament delivery device, in the form of softened or melted filaments that may be deposited on or adjacent the stage. The softened or melted filaments of the composition may be dried, cured, or otherwise solidified to ultimately form roads 16 of additively manufactured component 10. In some examples, the system may include an energy delivery device configured to deliver energy to the softened or melted filaments to cure the softened or melted filaments, for example, by photocuring or thermally curing the composition of the softened or melted filaments.

Regardless of whether the filament delivery device holds a reel of material or a volume of a material, the filament delivery device is configured to provide a material. The material may include a binder and a metal, alloy, or ceramic, as described above.

The technique of FIG. 2 also includes sintering additively manufactured component 10 (24). The sintering may include a thermal treatment, for example, one or more predetermined cycles of exposure to predetermined temperatures for predetermined times. In some examples, a computing device may control an energy source to deliver the energy to cause sintering. The sintering may promote the bonding of particles of metal, alloy, or ceramic to each other to strengthen and/or densify the component including substantially only the powders after the sacrificial binder is removed (either during sintering or during a prior, optional heat treatment to remove the sacrificial binder). Although the sintering (24) is depicted in FIG. 2 as occurring before depositing powder on a surface 14 of additively manufactured component 10 (26), in other examples, the sintering (24) may be performed after depositing powder on a surface 14 of additively manufactured component 10 (26), either as part of sintering the powder (28) or as a separate sintering step.

The technique of FIG. 2 also includes depositing powder on a surface 14 of additively manufactured component 10 (26). As described above, the powder may be deposited in surface layer 12 from a slurry, a suspension, a tape, or the like. A slurry or suspension may include the powder and a liquid carrier. The liquid carrier may vary widely so long as it is compatible with the powder. In some examples, the liquid carrier includes an aqueous carrier (e.g., water). In other examples, the liquid carrier includes an alcohol, a glycol, or the like. In some examples, the slurry or suspension may optionally include one or more additives such as, for example, a dispersant, a binder, a surfactant, a pH adjustor, and the like.

The slurry or suspension may be applied to surface 14 of additively manufactured component 10 using any suitable technique, including, for example, dip coating, brushing, rolling, spraying, or the like. The slurry then may be dried to remove volatile components of the slurry, such as the carrier liquid.

In other examples, a slurry may be deposited on a removable backing and dried to form a tape. The tape then may be applied to surface 14 of additively manufactured component 10.

Regardless of how the powder is deposited on surface 14 (26), the powder then may be sintered (28). The sintering may include a thermal treatment, for example, one or more predetermined cycles of exposure to predetermined temperatures for predetermined times. In some examples, a computing device may control an energy source to deliver the energy to cause sintering. The sintering may promote the bonding of particles of metal, alloy, or ceramic to each other to strengthen and/or densify the surface layer 12 including substantially only the powders after the sacrificial binder is removed (either during sintering or during a prior, optional heat treatment to remove the sacrificial binder). In some examples, the sintering may include multiple steps performed at different temperatures, e.g., a first temperature selected to cause sintering of material in roads 16 and a second temperature selected to cause sintering of the powder in surface layer 12.

Once the sintering is complete, additively manufactured component 10 and surface layer 12 may be exposed to HIP (30). For example, additively manufactured component 10, including surface layer 12, may be placed in a pressure containment vessel and exposed to a fluid under high pressures at a high temperature. The fluid may be selected to be inert to additively manufactured component 10, including surface layer 12. For example, a noble gas such as argon may be used. The temperature may be selected based on the materials of additively manufactured component 10 and surface layer 12.

Figure 3:
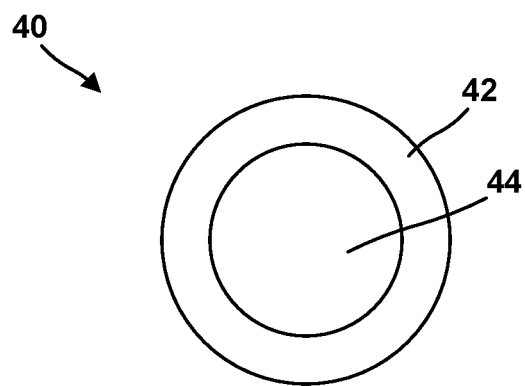
FIG. 3 is a conceptual diagram of an example additively manufactured component that includes a surface region and an internal region.

FIG. 3 is a conceptual diagram of an additively manufactured component 40 that includes a surface region 42 and an internal region 44. Surface region 42 is formed from a first powder that includes a first metal or alloy internal region 44 is formed from a second powder that includes a second metal or alloy. The first powder is different from the second powder in the second material in at least one respect. For example, the first and second powders may have substantially the same composition (e.g., may be the same metal or alloy) but the first powder may have a smaller average particle size, or a smaller average grain sizes within the particles than the second powder. This may enable surface region 42 to exhibit improved creep resistance, toughness, fatigue performance, or the like, compared to a surface region 42 formed from the second powder.

As another example, the first and second powders may have different compositions (e.g., may include different metals or alloys). For example, the first powder may include a first metal or alloy that includes superior oxidation or corrosion resistance than the second metal or alloy to provide superior oxidation or corrosion resistance to surface region 42. The second powder may include a second metal or alloy that provides superior mechanical properties.

As another example, the first powder may include a first metal or alloy that exhibits a lower coefficient of thermal expansion than the second metal or alloy in the second powder. Additively manufactured component 40 may be sintered to densify the component, and during cooling, the first metal or alloy in surface region 42 will contract more than the second metal or alloy in internal region 44, inducing compressive stress in surface region 42. The compressive stress may improve fatigue performance of component 40, which may be important for additively manufactured components, which generally include surface finishes that hurt fatigue performance.

Various examples have been described. These and other examples are within the scope of the following claims.

What is claimed is:

1. A method comprising:
   additively manufacturing an additively manufactured component, the additively manufactured component comprising a sacrificial binder and a metal or alloy;
   sintering, at a first time, the additively manufactured component, wherein the sacrificial binder is removed from the additively manufactured component;
   applying, at a second time that is after the first time, a slurry or suspension to the additively manufactured component using dip coating, wherein the slurry or suspension includes one or more of a dispersant, a surfactant, or a pH adjustor;
   depositing, at a third time that is after the second time, from the slurry or suspension, on a surface of the additively manufactured component, powder comprising at least one of a metal, an alloy, or a ceramic, wherein the powder has an average grain size that is smaller than an average grain size of the material used to form the additively manufactured component;
   sintering the powder to form a surface layer on the additively manufactured component; and
   hot isostatic pressing the additively manufactured component and the surface layer.

2. The method of claim 1, wherein the additively manufactured component comprises channels between adjacent tracks of material from which the additively manufactured component is formed, and wherein an average particle size of the powder is selected to facilitate the powder filling the channel at or near the surface of the additively manufactured component.

3. The method of claim 1, wherein the surface of the additively manufactured component comprises a stepped surface, and wherein the powder at least partially smooths the stepped surface.

4. The method of claim 3, wherein the powder has an average particle size that is less than a step size of the stepped surface.

5. The method of claim 1, wherein depositing the powder comprises depositing the powder from the slurry.

6. The method of claim 1, wherein the additive manufacturing technique comprises fused deposition modeling.

7. The method of claim 1, wherein the powder comprises a metal or alloy having a substantially similar composition to a metal or alloy of the additively manufactured component.

8. The method of claim 1, wherein the powder comprises a mixture of a ceramic and a metal or alloy.

9. The method of claim 1, wherein the powder comprises a ceramic.

10. The method of claim 1, wherein a characteristic of the powder is selected to provide a selected material characteristic to the surface layer, wherein the selected material characteristic comprises at least one of fatigue performance, creep resistance, corrosion resistance, toughness, coefficient of thermal expansion, or density.

11. A method comprising:
    additively manufacturing an additively manufactured component using fused deposition modeling, wherein the additively manufactured component comprises a sacrificial binder and a metal or alloy, and wherein the surface of the additively manufactured component comprises a stepped surface;
    sintering, at a first time, the additively manufactured component, wherein the sacrificial binder is removed from the additively manufactured component;
    applying, at a second time that is after the first time, a slurry or suspension to the additively manufactured component using dip coating, wherein the slurry or suspension includes one or more of a dispersant, a surfactant, or a pH adjustor;
    depositing, at a second third time that is after the first second time, from the slurry or suspension, on a surface of the additively manufactured component, powder comprising at least one of a metal, an alloy, or a ceramic, wherein the powder has an average particle size that is less than a step size of the stepped surface and at least partially smooths the stepped surface, and wherein the average particle size of the powder is selected to facilitate the powder filling pores at or near the surface of the additively manufactured component;
    sintering the powder to form a surface layer on the additively manufactured component; and
    hot isostatic pressing the additively manufactured component and the surface layer.

12. The method of claim 11, wherein the powder has a composition different from a composition of the additively manufactured component.

13. The method of claim 1, wherein the powder has an average particle size that is less than an average particle size of the material used to form the additively manufactured component, and wherein the average particle size of the powder is selected to facilitate the powder filling pores at or near the surface of the additively manufactured component.

14. The method of claim 1, wherein the sacrificial binder includes a polymeric material.

15. The method of claim 14, wherein the polymeric material is a thermoplastic.

16. The method of claim 1, wherein the metal or alloy is substantially uniformly dispersed in the sacrificial binder.

17. The method of claim 1, wherein the sacrificial binder is formed from a curable polymer precursor.

18. The method of claim 17, wherein the curable polymer precursor includes one or more monomers, oligomers, or non-crosslinked polymers suitable for forming the polymeric material of the sacrificial binder upon curing.

19. The method of claim 1, wherein the additively manufactured component comprises a first metal or alloy that has a first coefficient of thermal expansion, wherein the powder comprises a second metal or alloy that has a second coefficient of thermal expansion, wherein first coefficient of thermal expansion is higher than the second coefficient of thermal expansion, and wherein the first metal or alloy contracts a greater amount than the second metal or alloy during cooling after sintering.

20. The method of claim 1, wherein the additively manufactured component further comprises an oxide-dispersion strengthened alloy including one or more of a nickel chromium alloy, a thoria-dispersion strengthened nickel alloy, a nickel chromium alloy, a nickel aluminide alloy, an iron aluminide alloy, an iron chromium aluminide alloy, alumina, hafnia, zirconia, beryllia, magnesia, titanium oxide, silicon carbide, hafnium carbide, zirconium carbide, tungsten carbide, or titanium carbide.

21. The method of claim 20, wherein a particle shape of the oxide-dispersion strengthened alloy is an elongated grain shape.

* * * * *